(12) United States Patent
Tsuchiya et al.

(10) Patent No.: US 6,779,748 B2
(45) Date of Patent: Aug. 24, 2004

(54) TAPE CARTRIDGE WITH MOVABLE LEADER PIN-HOLDER

(75) Inventors: Manabu Tsuchiya, Yamagata (JP); Takashi Masuda, Yamagata (JP)

(73) Assignee: NEC Corporation, Tokyo (JP)

( * ) Notice: Subject to any disclaimer, the term of this patent is extended or adjusted under 35 U.S.C. 154(b) by 42 days.

(21) Appl. No.: 10/273,153

(22) Filed: Oct. 18, 2002

(65) Prior Publication Data

US 2003/0075635 A1 Apr. 24, 2003

(30) Foreign Application Priority Data

Oct. 19, 2001 (JP) ........................................ 2001-322464

(51) Int. Cl.[7] ............................................. G11B 23/107
(52) U.S. Cl. ................................... 242/348.2; 360/132
(58) Field of Search ......................... 242/348.2; 360/132

(56) References Cited

U.S. PATENT DOCUMENTS 6,349,016 B1 * 2/2002 Morita et al. ................ 360/132
6,462,905 B1 * 10/2002 Takahashi et al. ........... 360/132

FOREIGN PATENT DOCUMENTS

| JP | 2000-331403 | 11/2000 |
| JP | 2001-135003 | 5/2001 |

* cited by examiner

Primary Examiner—John Q. Nguyen
(74) Attorney, Agent, or Firm—McGinn & Gibb, PLLC

(57) ABSTRACT

A tape cartridge is disclosed which allows tape threading to be performed using a drive apparatus for use with a conventional cartridge and allows taking out of a leader pin thereof even if a leader block for engaging with the leader pin is not positioned very near to a case of the cartridge loaded at a predetermined position of a drive apparatus for a tape cartridge. A cartridge reel is disposed for rotation in a case, and a leader pin holder for holding a leader pin attached to an end of a tape wound on the reel is disposed in the case. The case has an aperture which permits passage of the tape therethrough, and the leader pin holder is mounted for pivotal motion around a shaft with respect to the case between a closing position at which it closes at least part of the aperture and an open position which opens the aperture. The leader pinholder is acted upon by biasing force toward the closing position. The leader pinholder is pivoted toward the open position against the biasing force through a relaying member to open at least part of the aperture through engagement thereof with a tape drive apparatus when the tape cartridge is loaded into the tape drive apparatus.

11 Claims, 22 Drawing Sheets

TAPE CARTRIDGE WITH MOVABLE LEADER PIN-HOLDER

BACKGROUND OF THE INVENTION

1. Field of the Invention

The present invention relates to a tape cartridge, and more particularly to a tape cartridge of the type wherein a leader pin is attached to an end of a tape wound on a reel and is caught and fed out, when the tape cartridge is loaded into a tape drive apparatus, from the tape cartridge so that the tape is threaded to a driving reel of the tape drive apparatus side and is fed along a predetermined path by the driving reel.

2. Description of the Related Art

As one of storage media for an electronic computer, a single reel cartridge magnetic tape is used. The magnetic tape of the type mentioned is wound on a core of a reel supported in a cartridge case for rotation with respect to the case with one end thereof secured to the core, and the other end portion of the magnetic tape is fed out from the cartridge case when the reel rotates.

The cartridge is loaded into a magnetic tape drive apparatus. In the magnetic tape drive apparatus, rotational driving force from a drive motor (reel motor) of the drive apparatus can be transmitted to the cartridge reel by a cartridge fitting mechanism. In order to form the cartridge fitting mechanism, on the cartridge side, a face-type gear (reel face gear) is provided on the reel such that it is exposed to an outer face of the case, and on the drive apparatus side, a face-type drive gear (drive face gear) for receiving transmission of rotating force from the reel motor is disposed such that the reel face gear and the drive face gear are disengageably engaged with each other.

In such a magnetic tape cartridge as described above, a pin called leader pin is attached to an end edge of the magnet tape fed out from the cartridge case. Where the entire magnetic tape is rewound and accommodated in the cartridge case, the leader pin is held by a leader pin holder provided at a predetermined position in the cartridge case. The leader pin holder is provided in the proximity of an aperture formed in a side face (end face) of the cartridge case. The aperture is closed up with a door, and upon a loading operation of the cartridge case into the drive apparatus, the door is opened in a predetermined direction to open the aperture thereby to allow accessing from the drive apparatus side through the aperture.

Such accessing as just mentioned is performed by a tape threading mechanism disposed on the drive apparatus side. The tape threading mechanism operates a leader block of a component thereof to approach and catch the leader pin and takes out the leader pin from the cartridge case together with the leader block and then threads the tape along a predetermined path passing the tape in the proximity of a magnetic head for recording and reproduction (tape threading). An end of the leader pin is introduced to a reel (machine reel) of the drive apparatus side, and the machine reel is rotated by a drive mechanism of the drive apparatus side to take up the tape.

Such a magnetic tape cartridge of the single reel type and a tape threading mechanism as described above are disclosed, for example, in Japanese Patent Laid-Open No. 2000-331403 and Japanese Patent Laid-Open No. 2001-135003.

For such a leader pin taking out operation by the leader block of the tape threading apparatus as described above, the leader pin holder is preferably disposed at a predetermined position in the drive apparatus as near as possible to the leader block.

Incidentally, in recent years, it is demanded to form a chamfered portion on a tape cartridge in such a shape that the tape cartridge is cut away at a corner portion of an end thereof. The cartridge has an aperture formed in the case thereof at the chamfered portion, and the leader pin holder is positioned in the proximity of the aperture. Accordingly, the leader pin is positioned farther from the side end face of the case than that of a conventional rectangular-shaped cartridge which has no chamfered portion. Therefore, a drive apparatus used for a conventional rectangularly shaped cartridge cannot be applied as it is to a cartridge on which the chamfered portion is formed.

Meanwhile, in order to raise the degree of freedom in designing of the drive apparatus side, it is preferable that, upon tape threading, the drive apparatus can perform an operation for taking out the leader pin from the tape cartridge positioned at a predetermined position in the drive apparatus by means of the leader block even from a position spaced by a comparatively great distance from the cartridge case.

While the foregoing description relates to a tape in the form of a magnetic tape, such a technical subject as described above is applicable also to an information recording medium tape other than a magnetic tape or any other tape which is used repetitively.

SUMMARY OF THE INVENTION

It is an object of the present invention to provide a tape cartridge which allows tape threading to be performed using a drive apparatus for use with a conventional cartridge.

It is another object of the present invention to provide a tape cartridge which allows taking out of a leader pin thereof even if a leader block for engaging with the leader pin is not positioned very near to a case of the cartridge loaded at a predetermined position of a drive apparatus for a tape cartridge.

In order to attain the object described above, according to the present invention, there is provided a tape cartridge, comprising a cartridge case, a cartridge reel disposed for rotation in the cartridge case, a tape wound on the cartridge reel, a leader pin attached to an end of the tape, a leader pin holder for holding the leader pin, the cartridge case having an aperture for permitting passage of the tape therethrough, the leader pin holder being movable between a closing position at which the leader pinholder closes at least part of the aperture of the cartridge case and an open position at which the leader pin holder opens at least part of the aperture, and means for exerting biasing force to act upon the leader pin holder toward the closing position, the leader pin holder being pivoted toward the open position against the biasing force to open at least part of the aperture through engagement thereof with a tape drive apparatus when the tape cartridge is loaded into the tape drive apparatus.

The tape cartridge may be configured such that the leader pin holder has a lever portion, and the cartridge case has an opening formed therein for allowing the lever portion of the leader pin holder and an engaging projection of the tape drive apparatus to engage with each other thereby to open at least part of the aperture.

The tape cartridge may further comprise a door mounted on the cartridge case for back and forth movement between a closing position at which the door closes part of the aperture and an open position at which the door opens part of the aperture, and door biasing means for exerting biasing force to act upon the door toward the closing position, the door being moved toward the open position against the biasing force to open part of the aperture through engagement thereof with the tape drive apparatus when the tape cartridge is loaded into the tape drive apparatus.

In this instance, the tape cartridge may further comprise a reel locking mechanism for blocking rotation of the cartridge reel with respect to the cartridge case, the reel locking mechanism including a locking pad disposed in a projecting manner for retreating movement from a reel face gear formed at a portion of the cartridge reel which is exposed from the cartridge case and a locking member disposed under biasing force to project toward the locking pad and blocked from pivotal motion with respect to the cartridge case, the locking member engaging with the cartridge reel to block rotation of the cartridge reel when the locking pad is projected from the reel face gear, the locking member being disengaged from the cartridge reel to permit rotation of the cartridge reel when the locking pad is retracted from the reel face gear, the reel locking mechanism including an unlocking control mechanism which includes a lever member mounted on the cartridge case for pivotal motion between a first pivotal position and a second pivotal position with respect to the cartridge case, the lever member keeping, when the lever member is at the first pivotal position, the locking member so as to block the retreating movement of the locking pad whereas the lever member keeps, when the lever member is at the second pivotal position, the locking member so as to permit the retreating movement of the locking pad, the lever member being engaged at an end thereof with the door such that the lever member is positioned at the first pivotal position when the door is at the closing position but is positioned at the second pivotal position when the door is at the open position.

Alternatively, the tape cartridge may further comprise a door mounted on the cartridge case for back and forth movement between a closing position at which the door closes part of the aperture and an open position at which the door opens part of the aperture, door biasing means for exerting biasing force to act upon the door toward the closing position, the door being moved toward the open position against the biasing force to open part of the aperture through engagement thereof with the tape drive apparatus when the tape cartridge is loaded into the tape drive apparatus, and a relaying member for engaging with the door and the leader pin holder such that, when the door moves from the closing position to the open position, the relaying member moves the leader pin holder toward the open position against the biasing force thereby to open at least part of the aperture.

In this instance, the tape cartridge may be configured such that the door has a cam at a portion thereof at which the door engages with the relaying member, and the relaying member is mounted for pivotal motion on the cartridge case and has a first contacting portion for contacting with the cam of the door and a second contacting portion for contacting with the leader pin holder such that the second contacting portion is acted upon by pivoting force originating from the biasing force from the leader pin holder, whereupon the first contacting portion is pressed toward the door by the pivoting force. The second contacting portion of the relaying member may have flexibility.

The aperture may be formed in an end face at a corner portion on the front side of the cartridge case with respect to an insertion direction of the tape cartridge into the tape drive apparatus. The corner portion of the cartridge case at which the aperture may be formed is formed as a chamfered portion of a cutaway shape, and the leader pin holder may be positioned so as to close principally a portion of the aperture corresponding to the chamfered portion.

The leader pin holder may have two slots for accommodating the opposite ends of the leader pin.

The tape cartridge may further comprise a reel locking mechanism for blocking rotation of the cartridge reel with respect to the cartridge case, the reel locking mechanism including a locking pad disposed in a projecting manner for retreating movement from a reel face gear formed at a portion of the cartridge reel which is exposed from the cartridge case and a locking member disposed under biasing force to project toward the locking pad and blocked from pivotal motion with respect to the cartridge case, the locking member engaging with the cartridge reel to block rotation of the cartridge reel when the locking pad is projected from the reel face gear, the locking member being disengaged from the cartridge reel to permit rotation of the cartridge reel when the locking pad is retracted from the reel face gear.

The tape cartridge is advantageous in that it allows tape threading to be performed using a drive apparatus same as a drive apparatus for a conventional cartridge. The tape cartridge is further advantageous in that it allows taking out of the leader pin without making a leader block for engagement with the leader pin approach the case of the tape cartridge loaded at a predetermined position of the drive apparatus very much.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENTS

FIGS. 1 to 7 show a tape cartridge to which the present invention is applied. In FIGS. 1 to 7, the insertion direction of the tape cartridge upon loading into a tape drive apparatus is indicated by an arrow mark X, and the taking out direction of the tape cartridge from the tape drive apparatus is indicated by another arrow mark Y.

Referring to FIGS. 1 to 7, the tape cartridge shown includes a cartridge case 12 which has a substantially rectangular shape as viewed in plan, but has, at a corner portion on the front end side thereof in the X direction of the insertion direction into a drive apparatus, an obliquely cutaway portion or chamfered portion 12a. An aperture 12b is formed in the cartridge case 12 such that it extends along the chamfered portion 12a and a side face contiguous to the chamfered portion 12a. In other words, the aperture 12b is formed in an end face at a corner portion on the front side of the cartridge case 12 with respect to the X direction. Meanwhile, an opening 12c is formed in the end face on the front face side of the cartridge case 12 at a position near to the aperture 12b.

Figure 8:
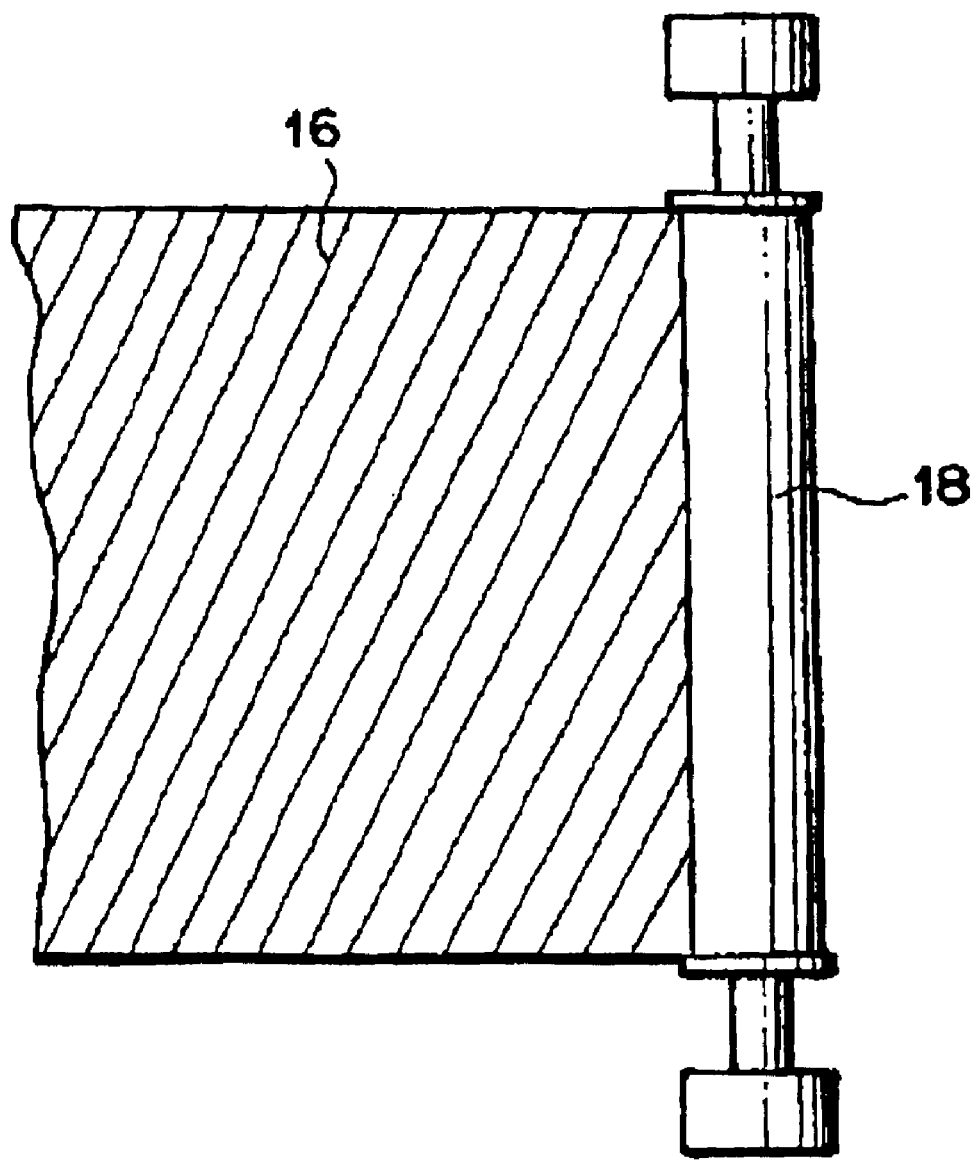
FIG. 8 is an enlarged schematic view showing an end portion of a magnetic tape of the tape cartridge of FIG. 1 to which a leader pin is attached.

A cartridge reel 14 is disposed in the cartridge case 12 for rotation around a vertical axis with respect to the case 12. A magnetic tape 16 (refer to FIG. 8) having one end attached to a core 14a of the cartridge reel 14 is wound around the cartridge reel 14. Referring to FIG. 8, a leader pin 18 is attached to a leading end edge of the magnetic tape 16, that is, an end edge of the magnetic tape 16 remote from the end edge attached to the reel core 14a. The magnetic tape 16 is fed out through the aperture 12b of the case 12.

Figure 1:
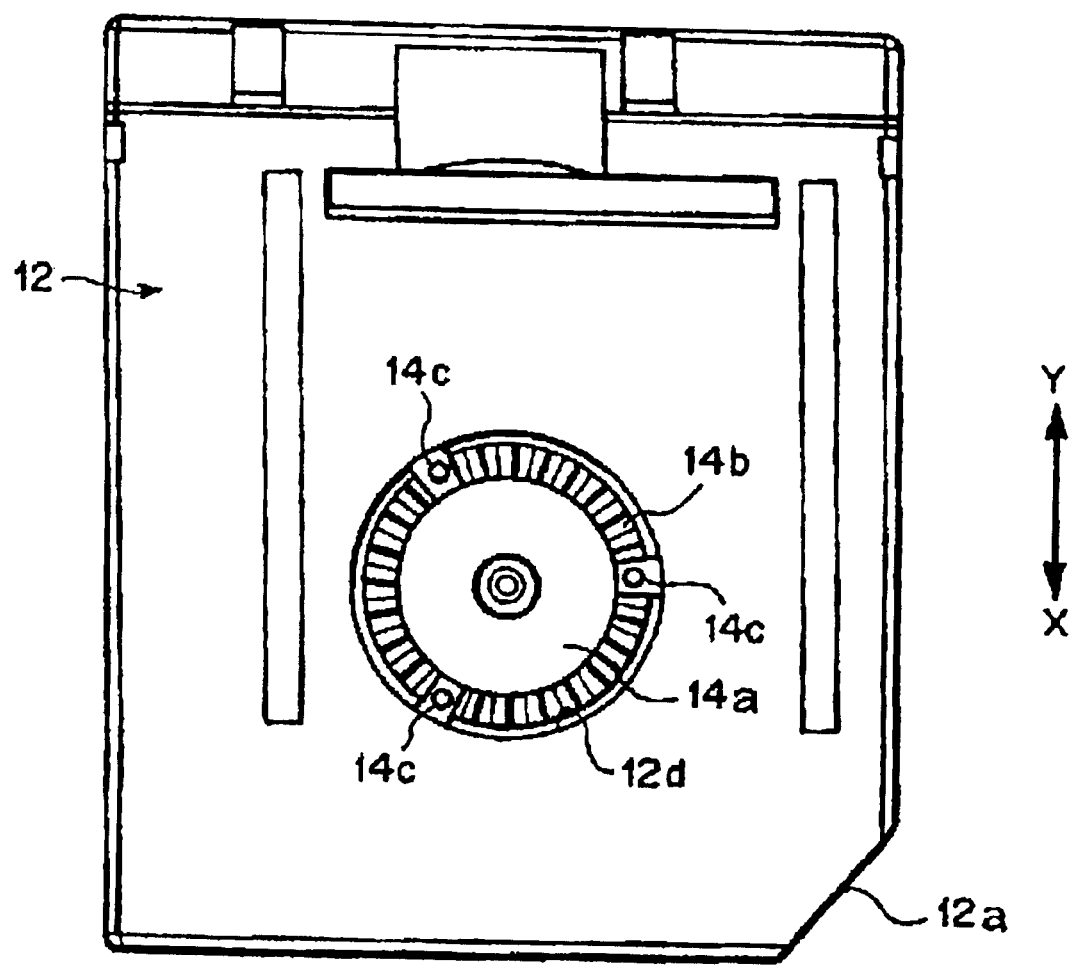
FIG. 1 is a bottom plan view of a tape cartridge to which the present invention is applied.
Figure 2:
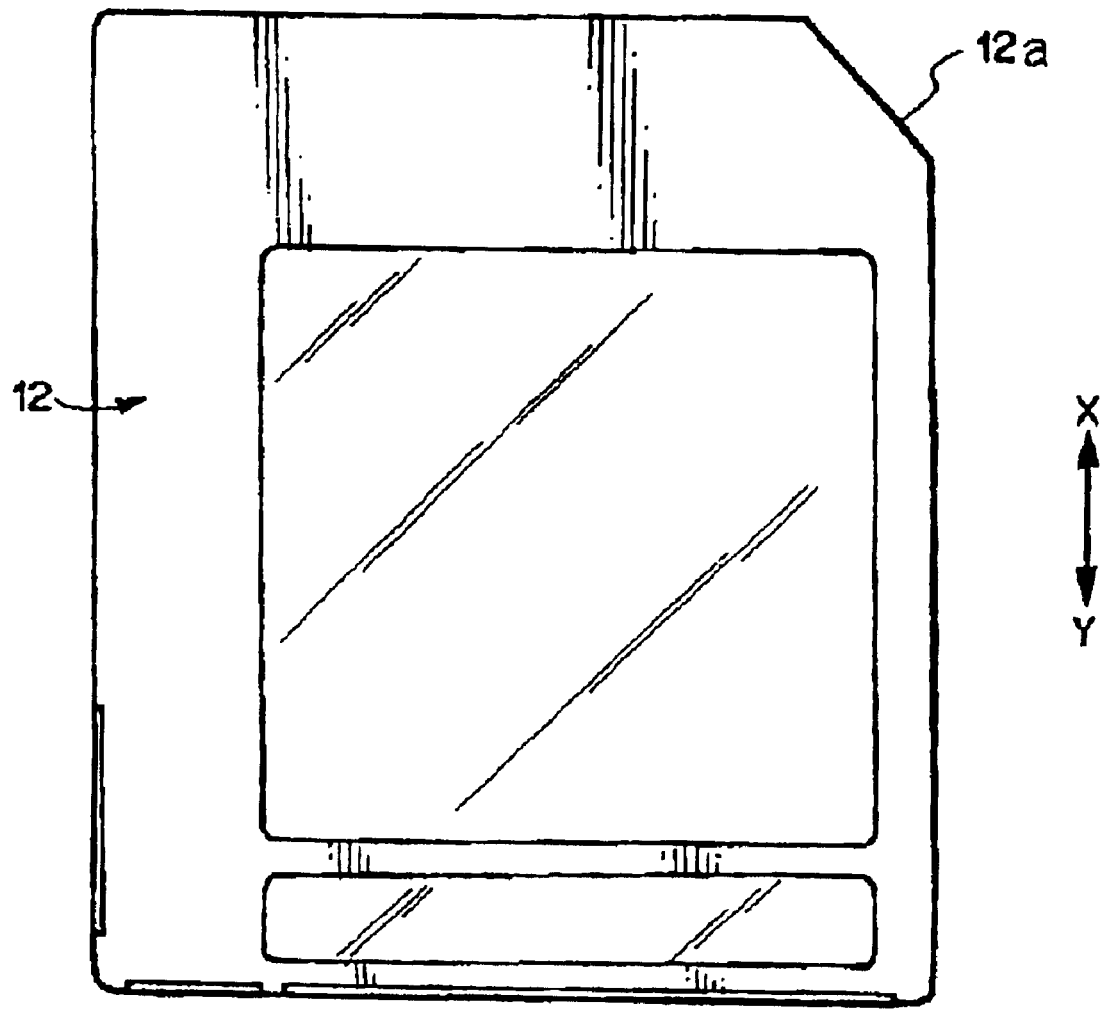
FIGS. 2, 3 and 4 are a top plan view, a front elevational view and a side elevational view, respectively, of the tape cartridge of FIG. 1.
Figure 3:
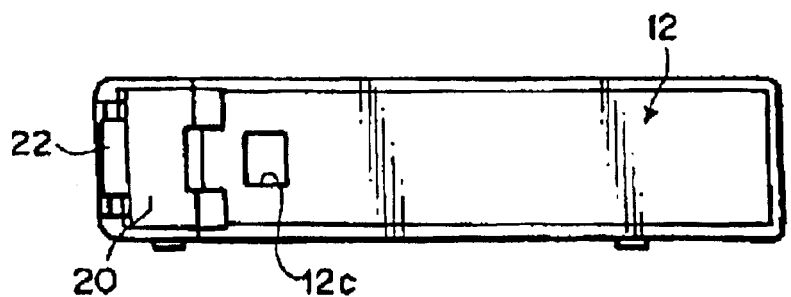
Figure 4:
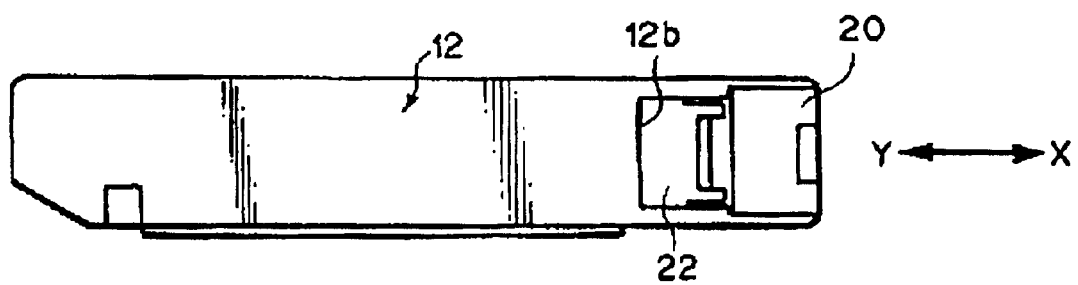

Referring particularly to FIG. 1, the bottom face of the core 14a is exposed to the outside of the case 12 through a reel hole 12d formed in the bottom wall of the cartridge case 12. A reel face gear 14b for meshing with a drive face gear connected to an output rotary shaft of a reel motor of a drive apparatus not shown is formed on the bottom face of the core 14a. Further, locking pads 14c project downwardly from portions of the reel face gear 14b from which gear teeth are removed (also the portions form the reel face gear 14b). When the reel face gear 14b is brought into meshing engagement with the drive face gear, the locking pads 14c are pushed up by the teeth of the drive face gear thereby to cancel locking by a locking mechanism for blocking relative rotation of the reel 14 with respect to the case 12.

Figure 9:
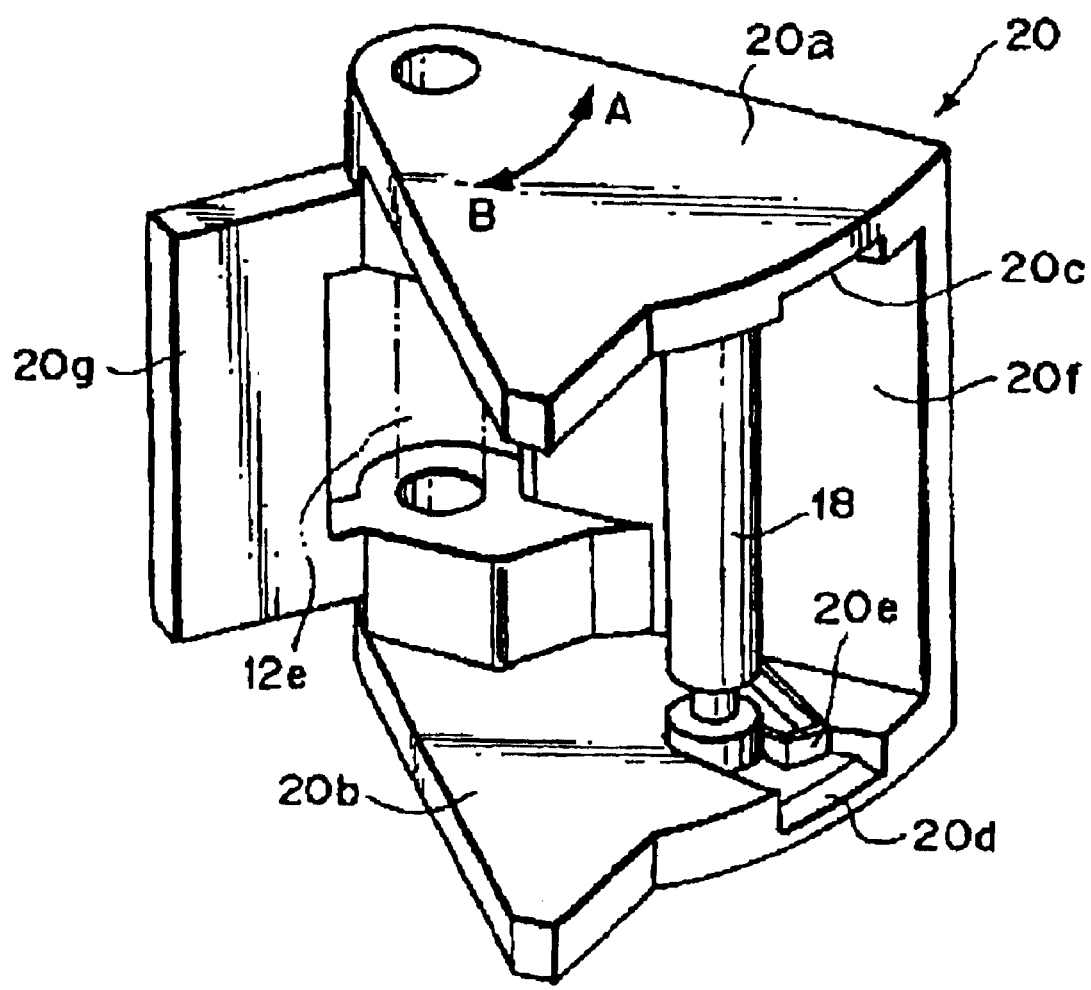
FIG. 9 is perspective view of a leader pin holder of the tape cartridge of FIG. 1 and the leader pin held by the leader pin holder.

Referring to FIGS. 3 to 7, a leader pinholder 20 is disposed at a position in the cartridge case 12 at which it opposes to the aperture 12b. FIG. 9 particularly shows the leader pin holder 20 and the leader pin 18 held by the leader pin holder 20. The leader pin holder 20 is mounted for pivotal motion in the directions of arrow marks A-B around a vertical shaft 12e attached to the cartridge case 12. A pair of slots 20c and 20d for receiving an upper end and a lower end of the leader pin 18 are formed on mutually opposing faces of an upper side flat plate portion 20a and a lower side flat plate portion 20b, which extend in parallel to each other, of the leader pin holder 20, respectively. Each of the slots 20c and 20d has a holding spring 20e disposed therein for holding an end portion of the leader pin 18 accommodated therein.

Figure 5:
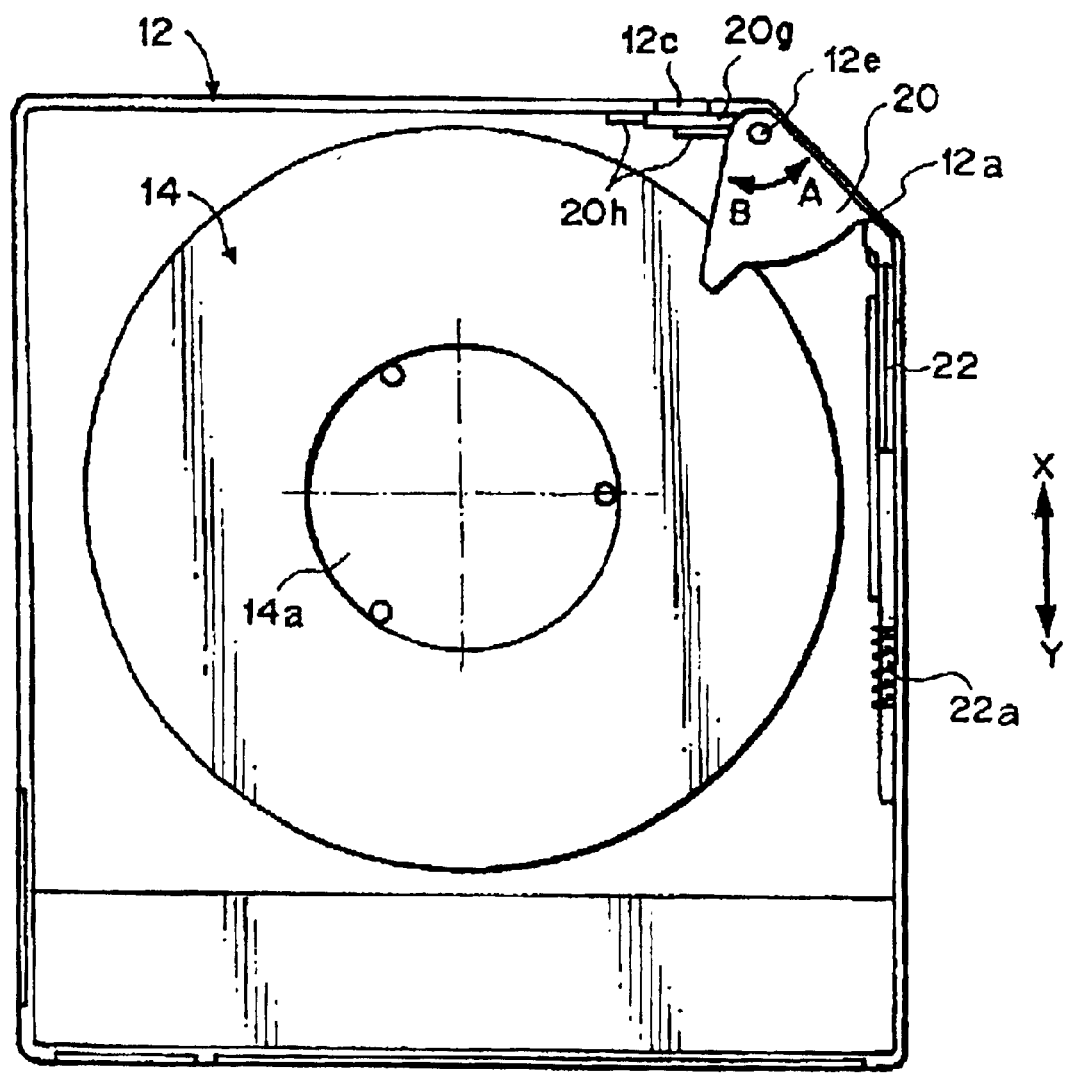
FIGS. 5, 6 and 7 are a top plan view, a side elevational view and a perspective view, respectively, of the tape cartridge FIG. 1 with an upper half of a cartridge case thereof removed.
Figure 6:
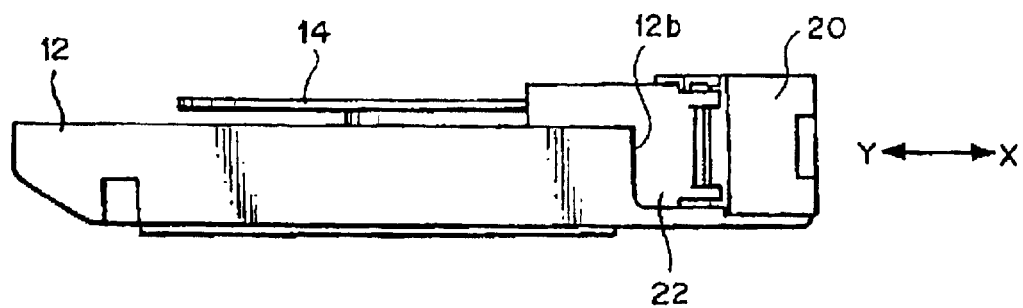
Figure 7:
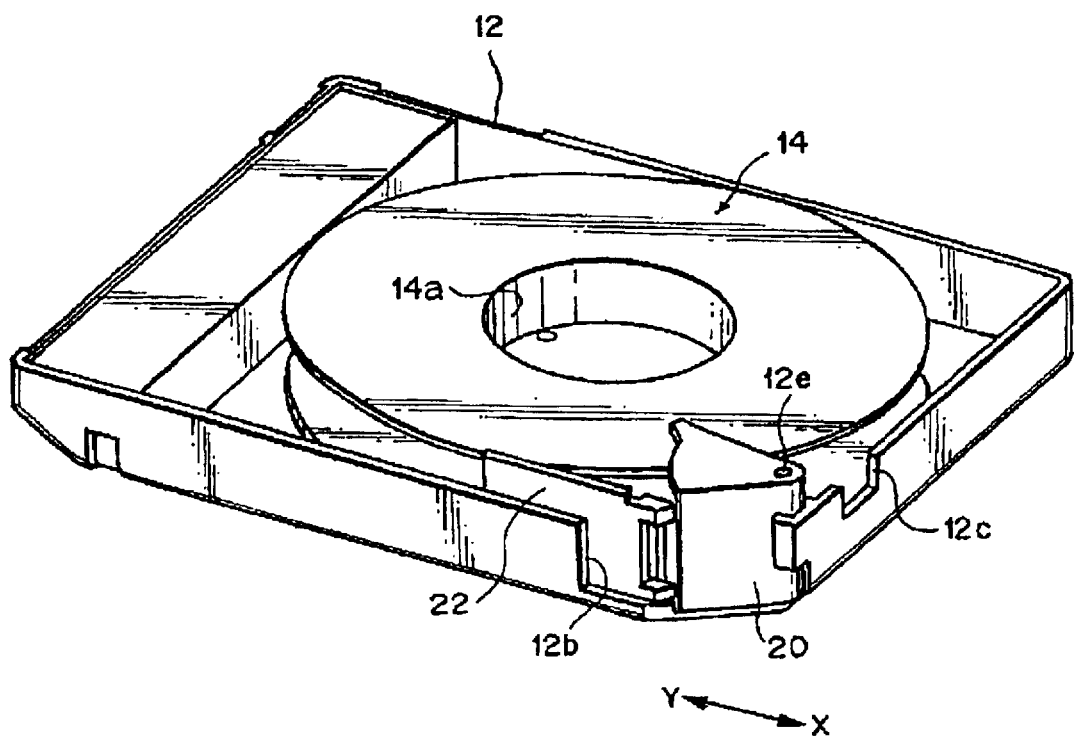

The leader pin holder 20 has a side face portion 20f contiguous to the upper side flat plate portion 20a and the lower side flat plate portion 20b, and further has a lever portion 20g positioned on the opposite side of the side face portion 20f with respect to the position of the shaft 12e. As seen in FIG. 5, the leader pin holder 20 is biased in a direction of an arrow mark B by an end of a spring 20h the other end of which attached to the cartridge case 12 so that the lever portion 20g is resiliently pressed against an inner face of the cartridge case 12. In this state, the lever portion 20g closes up the opening 12c of the cartridge case 12 from the inside, and the side face portion 20f closes part of the aperture 12b, that is, a portion of the aperture corresponding to the chamfered portion 12a of the cartridge case 12.

A door 22 is disposed at a position of the cartridge case 12 at which it opposes to the aperture 12b. The door 22 is attached to the case 12 for back and forth movement in the X-Y directions along the side end face of the cartridge case 12. As seen in FIG. 5, the door 22 is biased in the X direction by a spring 22a so that it is contacted with an arresting portion not shown of the cartridge case 12. In this state, an end portion of the door 22 in the X direction closes part of the aperture 12b, that is, a portion of the aperture on the side face side contiguous to the aperture portion corresponding to the chamfered portion 12a of the cartridge case 12.

Figure 10:
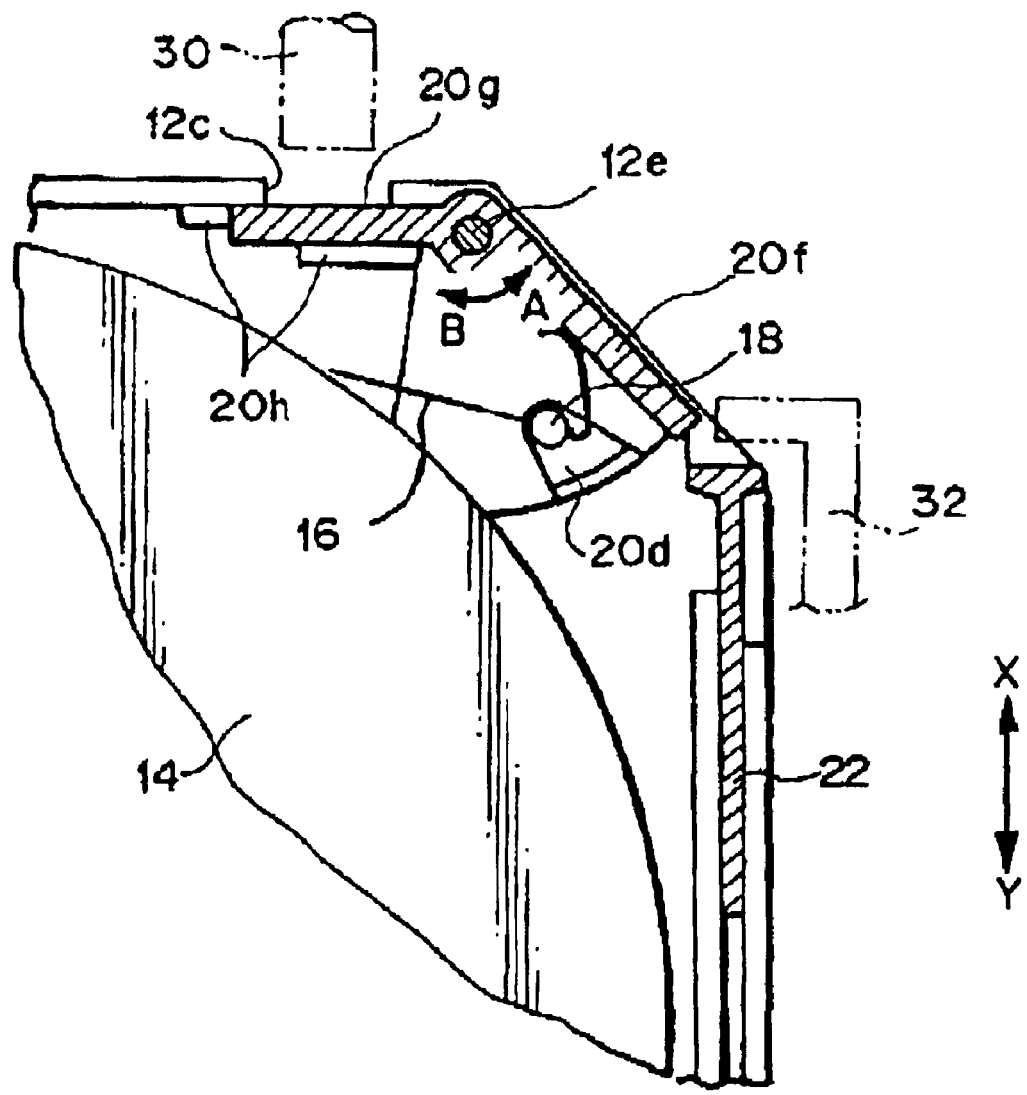
FIG. 10 is a partial sectional view showing the tape cartridge of FIG. 1 during a loading operation thereof into a cartridge tray of a magnetic tape drive apparatus.

Now, operation of the disk cartridge is described. FIG. 10 shows the cartridge during a loading operation of the cartridge into a cartridge tray of a magnetic tape drive apparatus not shown, and FIGS. 11 and 12 show the cartridge after it is loaded fully into the cartridge tray.

The cartridge tray is provided in the drive apparatus and performs a loading operation of accepting and holding a cartridge inserted in the X direction into the drive apparatus and moving the cartridge to a predetermined position at which a threading operation can be performed, that is, a position at which the reel face gear exposed to the bottom face of the cartridge can be engaged with the drive face gear of the drive apparatus side. The cartridge is moved in the X direction into and stopped on the cartridge tray by a mechanism not shown and held at a predetermined position with respect to the cartridge tray.

Figure 11:
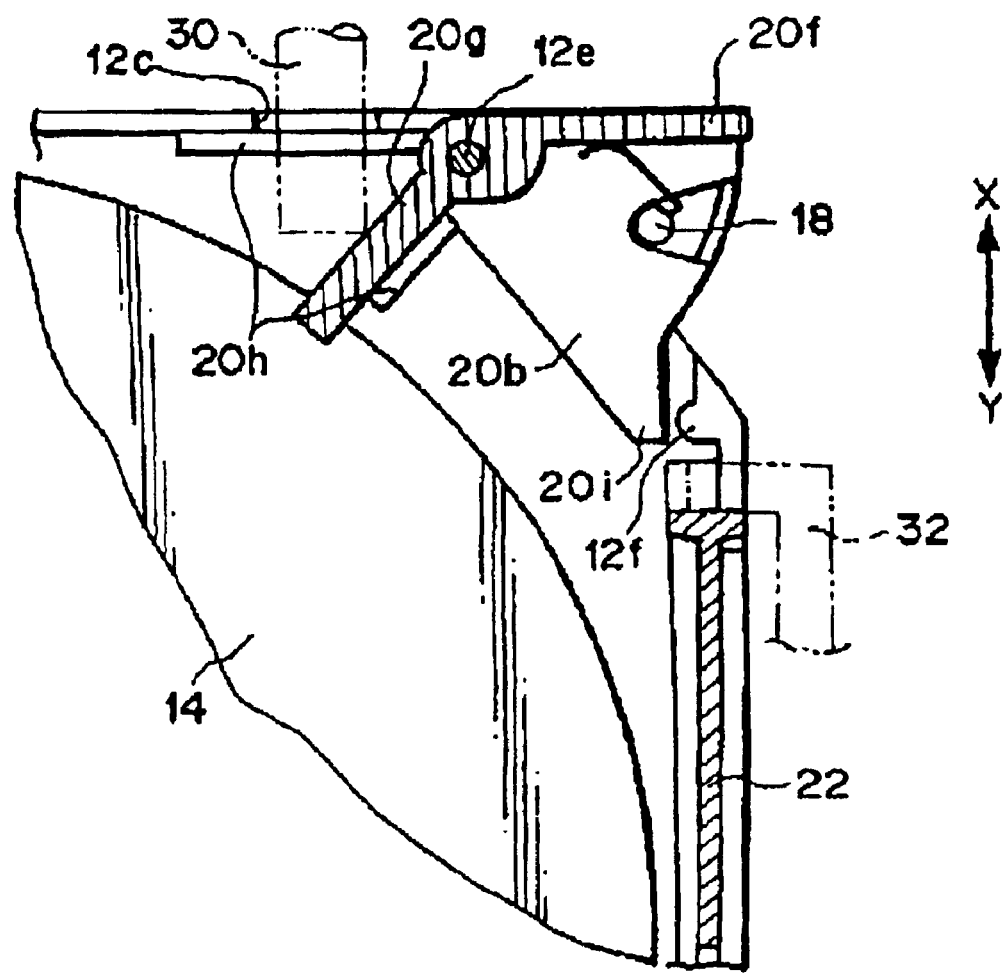
FIGS. 11 and 12 are a partial sectional view and a partial perspective view, respectively, showing the tape cartridge of FIG. 1 after the loading thereof into the cartridge tray of the magnetic tape drive apparatus is completed.
Figure 12:
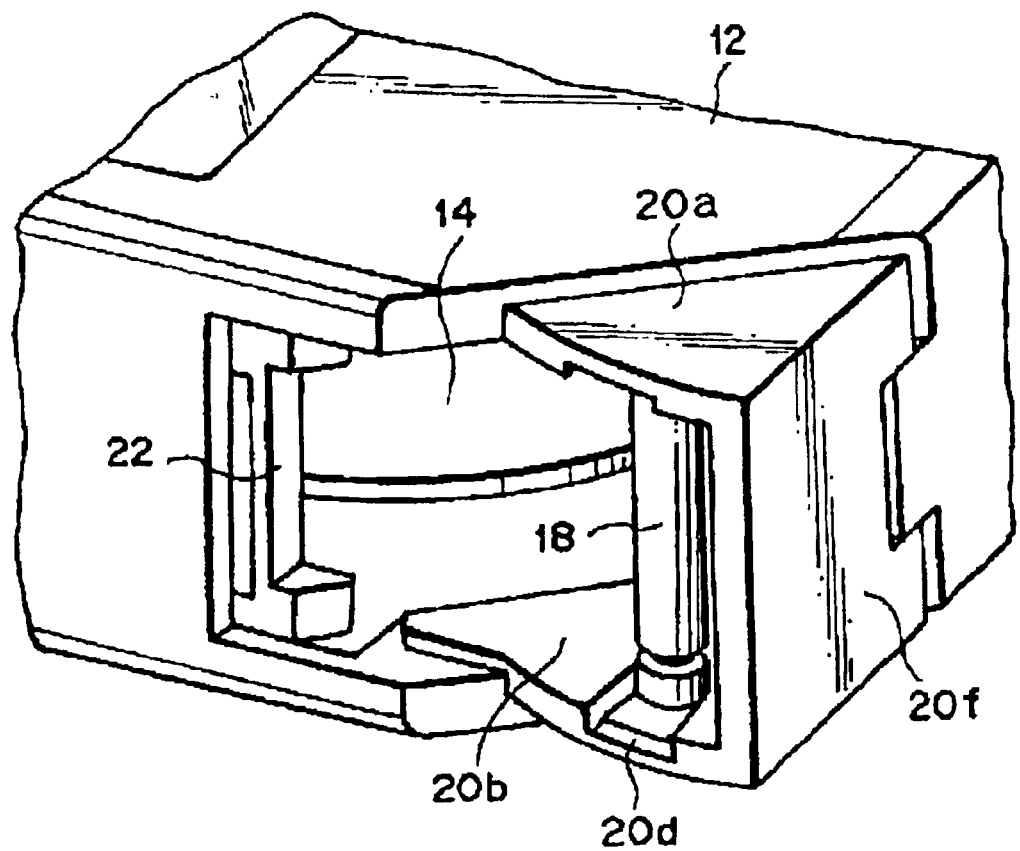

In FIG. 10, the cartridge is shown positioned forwardly of the stopping position with respect to the tray, and in FIGS. 11 and 12, the cartridge is shown stopped at the predetermined position with respect to the tray. Referring to FIG. 10, an engaging projection 30 secured to the cartridge tray is positioned forwardly of and in an opposing relationship to the opening 12c of the cartridge case 12 with respect to the X direction such that it projects in the Y direction. Another engaging projection 32 is secured to the cartridge tray and positioned forwardly of and in an opposing relationship to the door 22 in the X direction. In this state, the leader pinholder 20 is in its closing position, and the door 22 is in its closing position. If the cartridge moves in the X direction from the position of FIG. 10, then the end of the engaging projection 30 soon advances into the cartridge case 12 through the opening 12c and collides with the lever portion 20g of the leader pin holder 20 to pivot the leader pin holder 20 in the A direction around the shaft 12e against the biasing force of the spring 20h. This pivotal motion is stopped as ends 20i of the flat plat portions 20a and 20b of the leader pinholder 20 are contacted with arresting projections 12f provided on the cartridge case 12 as shown in FIG. 11. Meanwhile, the end of the engaging projection 32 is engaged with an engaging portion formed at the end of the door 22 to move the door 22 in the Y direction against the biasing force of the spring 22a. This movement is stopped as the door 22 is contacted with an arresting portion not shown provided on the cartridge case 12. In this state, the leader pin holder 20 is positioned at its open position and the door 22 is positioned at its open position.

In other words, the lever portion 20g of the leader pin holder 20 and the opening 12c formed in the cartridge case 12 so as to permit engagement of the engaging projection 30 with the lever portion 20g are provided as aperture opening means.

In order to allow such stopping of pivotal motion of the leader pin holder 20 at its predetermined position and stopping of movement of the door 22 at its predetermined position as described above to be performed smoothly, the engaging projections 30 and 32 can be held for movement in the X-Y directions with respect to the cartridge tray through springs stronger than the spring 20h provided for biasing the leader pin holder 20 and the spring 22a provided for basing the door 22.

It is to be noted that, although, in the figures, for the convenience of easier understanding of description of operation, the lever portion 20g of the leader pin holder 20 is shown having a considerably great length from the shaft 12e and also the opening 12c and the engaging projection 30 are shown positioned correspondingly, the length of the lever portion 20g can be reduced so that the lever portion 20g and the engaging projection 30 may be engaged with each other at a position closer to the shaft 12e. Accordingly, it is possible to prevent the magnetic tape 16 connected to the leader pin 18 from being subject to interference from the lever portion 20g in the state shown in FIGS. 11 and 12. Or, in order to prevent interference with the magnetic tape 16 from the lever portion 20g, the vertical positions of the lever portion 20g, opening 12c and engaging projection 30 can be set to positions different from those of the magnetic tape 16 and the reel 14 with respect to the thicknesswise direction, that is, the vertical direction, of the magnetic tape 16 and also of the cartridge reel 14.

Where the leader pin holder 20 is set to its open position and the door 22 is set to its open position in such a manner as described above as described hereinabove with reference to FIGS. 11 and 12, a state wherein the aperture 12b is open is achieved. In this state, the leader pin 18 is positioned at a position which was outside the cartridge case 12 in the state of FIG. 10 while it is held by the slot 20d. Consequently, the leader pin 18 is disposed at a position equivalent to a position at which the leader pin 18 is disposed in the case of a rectangular cartridge, that is, a cartridge on which the chamfered portion 12a is not formed.

Figure 13:
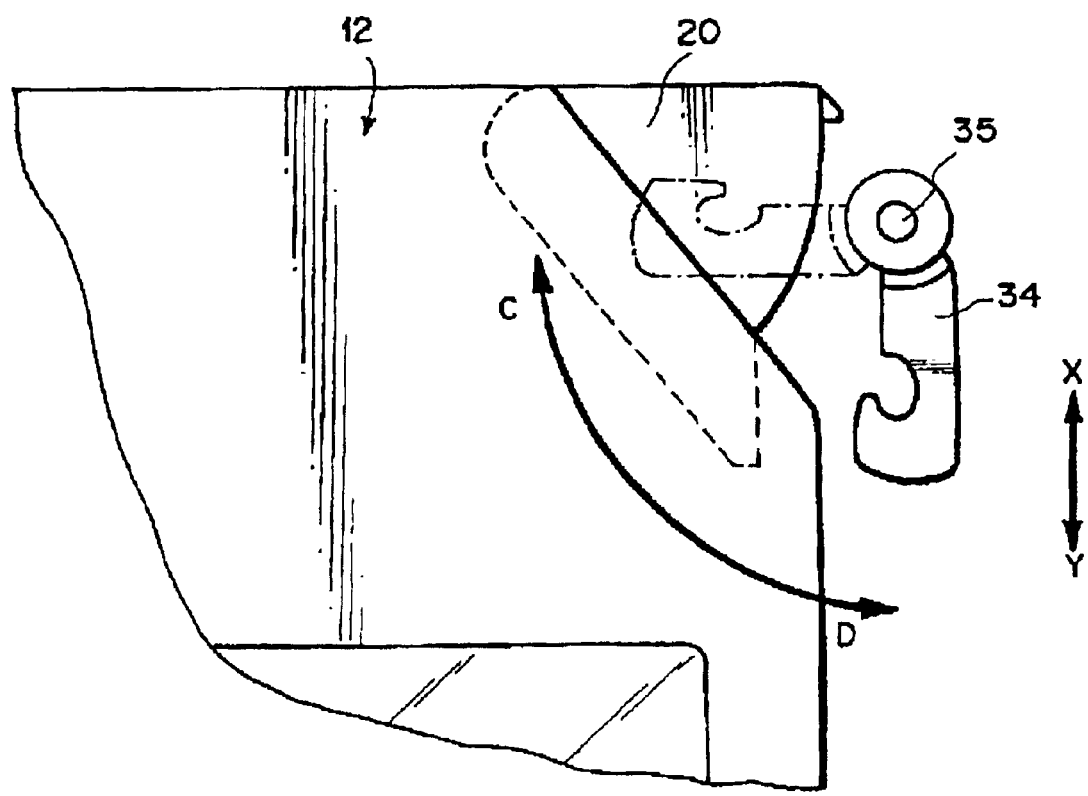
FIGS. 13 and 14 are a plan view and a sectional view, respectively, illustrating a manner wherein the leader pin in the tape cartridge of FIG. 1 is caught by a leader block of the drive apparatus.
Figure 14:
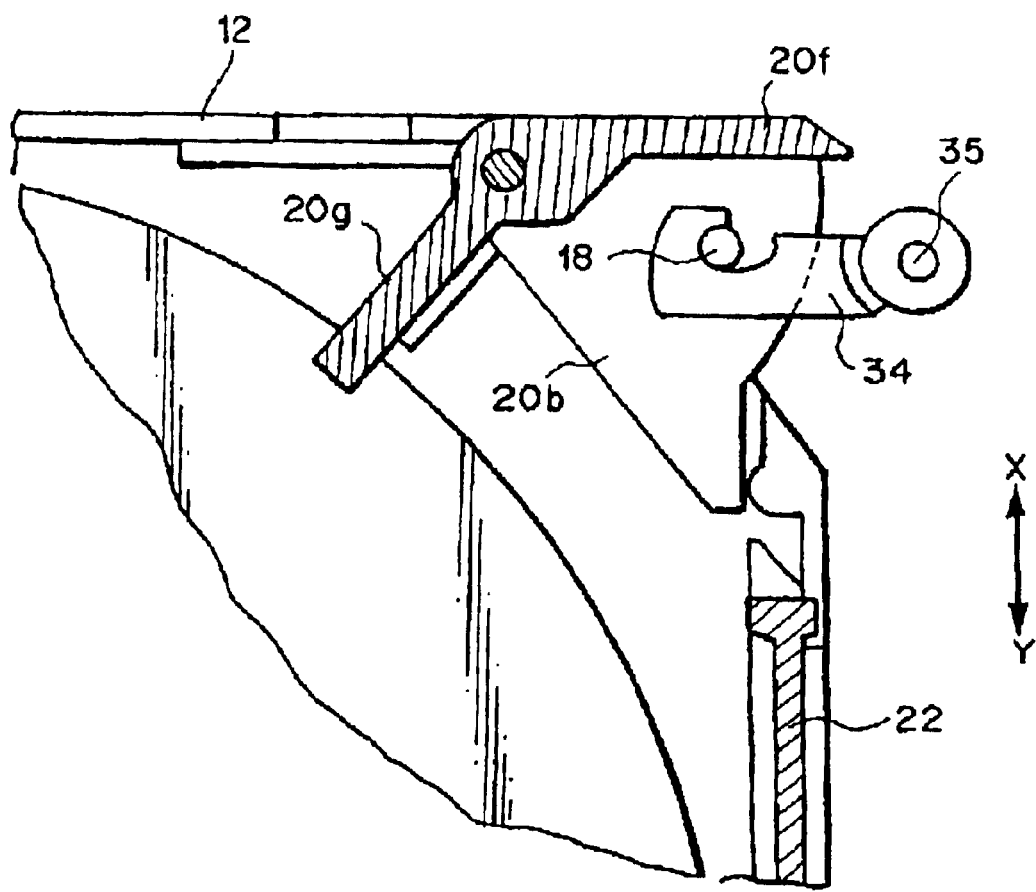

FIGS. 13 and 14 illustrate a manner wherein the leader pin 18 is caught by a leader block 34, which forms the threading mechanism of the drive apparatus, in such a state as described above with reference to FIGS. 11 and 12.

The leader block 34 is held by and disposed on the drive apparatus for pivotal motion around a vertical shaft 35 at a position at which it is positioned in the proximity of the leader pin 18 when the cartridge is held at the predetermined position of the cartridge tray and the state of FIGS. 11 and 12 is reached. Upon threading operation, the leader block 34 is pivoted in the direction of an arrow mark C around the shaft 35 from a state indicated by a solid line in FIG. 13 to another state indicated by an imaginary line. Consequently, the leader pin 18 is fitted into a leader pin capture groove of the leader block 34 thereby to make it possible to take out the leader pin 18 from the cartridge case 12 by the leader block 34.

As described above, when the cartridge aperture is closed, the leader pin 18 is positioned on the inner side of the case 12 in the proximity of the chamfered portion 12a, and even if the side face portion 20f of the leader pin holder 20 is not present, it is difficult for the leader block 34 to operate from this position to take out the leader pin 18 to the outside of the cartridge case 12. However, since the leader pin holder 20 is pivoted to open the cartridge aperture in the course of operation of accepting and holding the cartridge into and in the cartridge tray, the leader pin 18 can be moved to the outside of the case and taken out readily by means of the leader block 34. Accordingly, where the present cartridge is used, threading similar to that in the case of a conventional cartridge having a rectangular outer shape can be performed. Thus, there is an advantage that a drive apparatus having the same threading mechanism can be used commonly.

Figure 15:
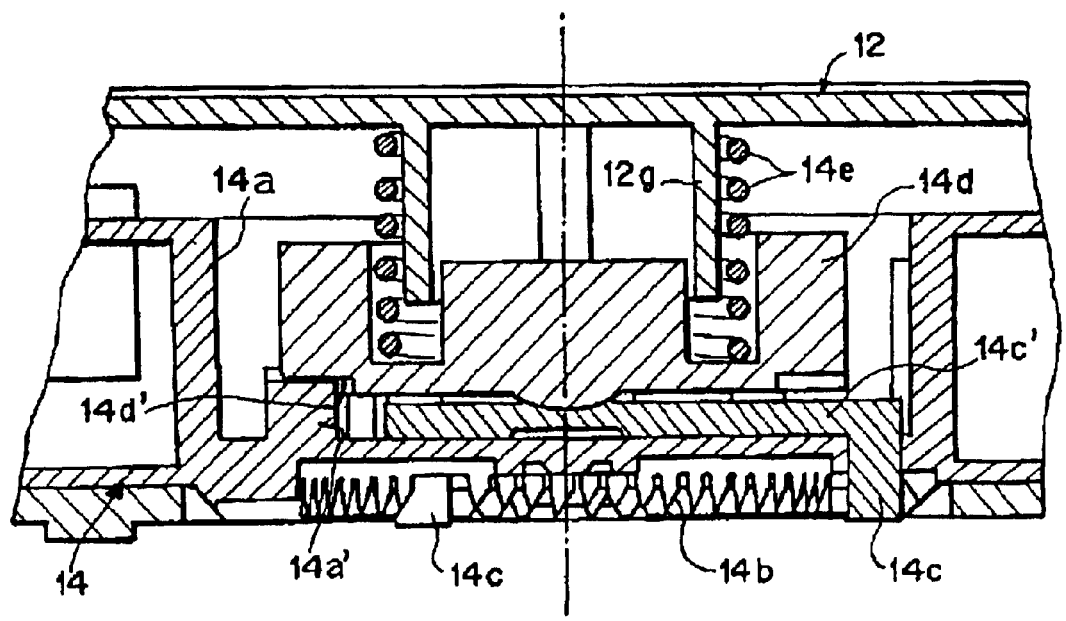
FIG. 15 is a partial sectional view showing a reel locking mechanism of the tape cartridge of FIG. 1.
Figure 16:
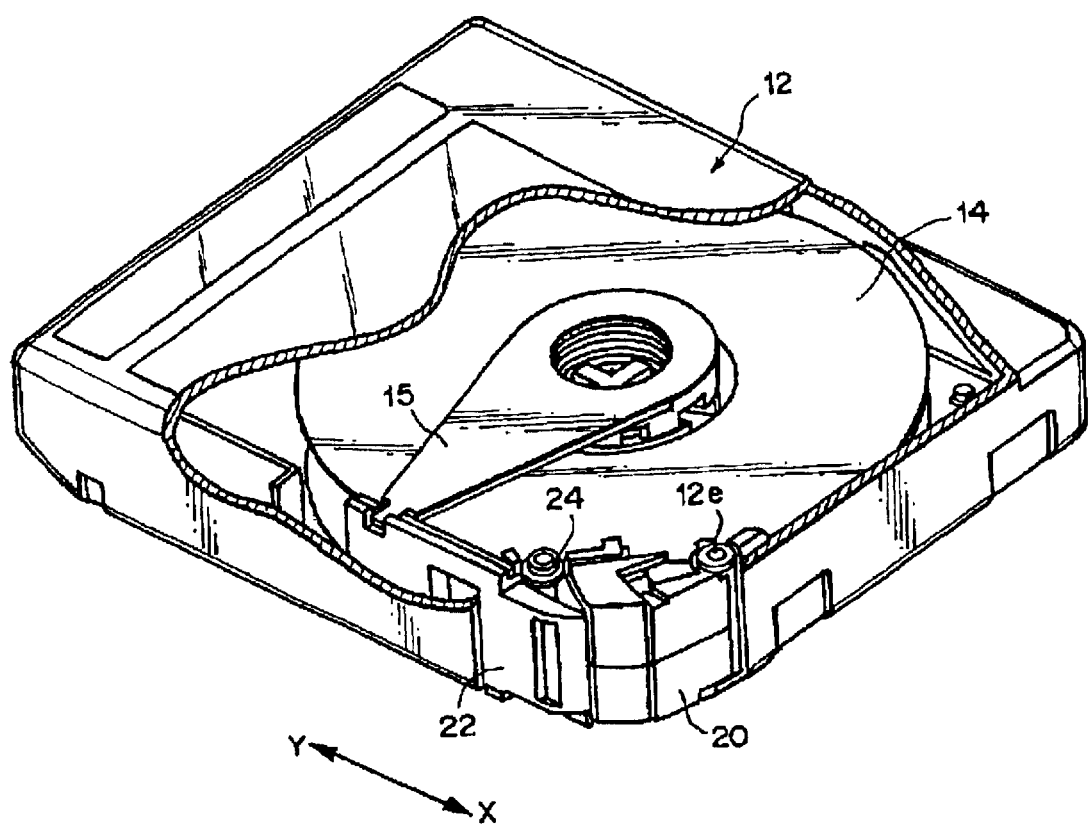
FIG. 16 is a perspective view partly broken of another tape cartridge to which the present invention is applied.

FIG. 15 shows a reel locking mechanism of the tape cartridge described above.

Referring to FIG. 15, the reel face gear 14b is formed in an annular shape around the center of rotation of the reel. The three locking pads 14c disposed at equal distances in a circumferential direction project downwardly from the reel face gear 14b. The three locking pads 14c extend upwardly through the reel face gear 14b and are connected to a common base plate portion 14c' within the core 14a in the cartridge case 12. The base plate portion 14c' has a substantially triangular shape in plan having apexes at the three locking pads 14c. Meanwhile, a guide 12g is formed such that it projects downwardly to the lower side of a central portion of the upper plate portion of the case 12, and a reel locking member 14d is mounted on the guide 12g in such a manner that it is slidably movable in upward and downward directions but is held against rotation around a vertical axis. The reel locking member 14d is biased downwardly by a coil spring 14e and contacts at a central portion of a lower portion thereof with the lock pad base plate portion 14c'. Accordingly, the locking pads 14c are biased downwardly. Meanwhile, a latch gear 14a' is formed on an upper face side of the reel face gear 14b arcuately around the center of rotation of the reel 14 in a region other than the region which corresponds to the triangular shape of the locking pad base plate portion 14c'. Further, a latch gear 14d' disposed arcuately around the center of rotation of the reel 14 is formed in a corresponding relationship to the latch gear 14a' on an outer peripheral portion of the lower face of the locking member 14d. The latch gear 14d' meshes with the latch gear 14a' to lock rotation of the reel 14 with respect to the case 12.

FIG. 15 shows the locking pads 14c shown positioned projecting from the gear face. This state is assumed when a loading operation into the drive apparatus is not completed as yet. When the loading operation into the drive apparatus is completed, the locking pads 14c and the locking member 14d are pushed upwardly against the biasing force of the coil spring 14e through the fitting of the locking pads 14c with the drive face gear. At this retracted position, since the locking member 14d is pushed upwardly, the engagement between the latch gears 14a' and 14d' is canceled, that is, the locking is canceled, and rotation of the reel 14 is permitted. Upon such rotation of the reel 14, also the locking pads 14c rotate integrally, and the base plate portion 14c' and the reel locking member 14d rotate relative to each other while a central portion of the upper face of the base plate portion 14c' and a central portion of the lower portion of the reel locking member 14d contact at a point with each other. It is to be noted that, if the fitting with the drive face gear is canceled, then the locking member 14d and the locking pads 14c are moved downwardly by the biasing force of the coil spring 14e, whereupon the latch gears 14a' and 14d' are soon engaged with each other to establish a locking condition. It is to be noted that the shape of the teeth of the latch gears 14a' and 14d' can be set suitably so that locking is effective only for rotation in one direction in which the magnetic tape is fed out from the reel 14 whereas locking is ineffective for rotation in the opposite direction.

FIGS. 16 to 20 show another tape cartridge to which the present invention is applied.

Figure 23:
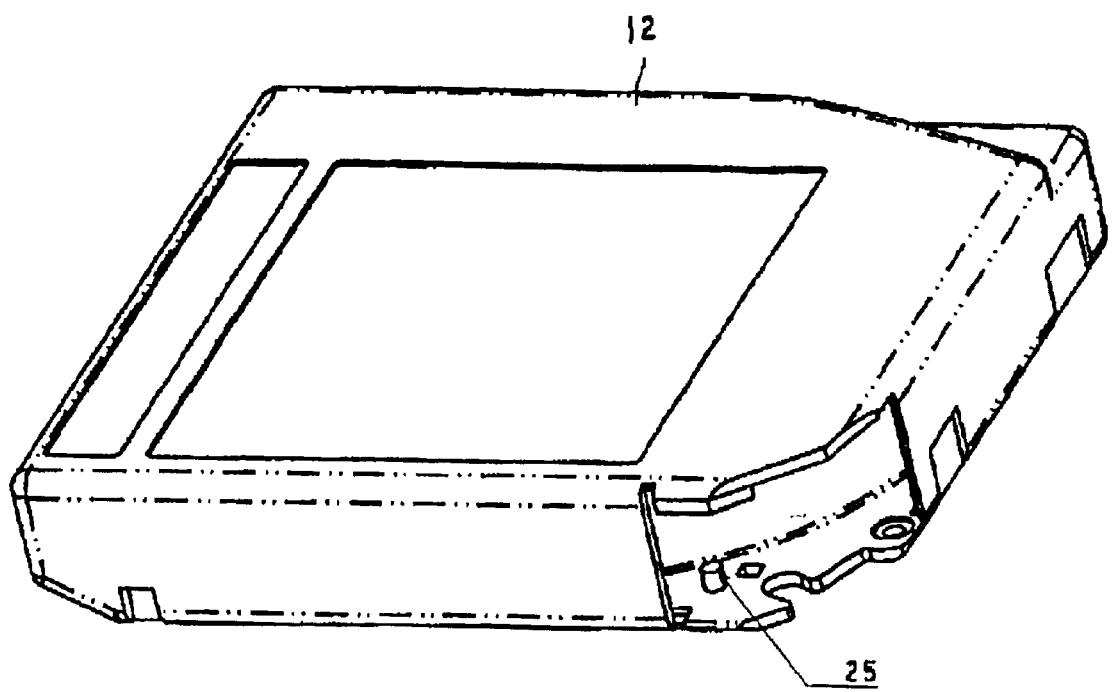
FIGS. 23 and 24 are perspective views of the tape cartridge of FIG. 16 as viewed in different direction with some components removed.

The tape cartridge of the present embodiment is a modification to and includes common components to those of the tape cartridge of the first embodiment described above, but is different only in the configuration of aperture opening means. Referring to FIGS. 16 to 20, in the tape cartridge shown, a cam hole 22c is formed in the door 22 attached to the case 12. Meanwhile, a pin 25 is attached in parallel to the shaft 12e in the cartridge case 12. While, in FIG. 17, only the pin 25 attached to the lower side plate of the case is shown, another pin 25 paired with the pin 25 is disposed also on the upper side plate of the case in an opposing relationship to the pin 25 as seen in FIG. 23. A relaying member 24 is held by the pair of pins 25 and disposed for pivotal motion around a vertical center of pivotal motion.

The relaying member 24 has a first contacting portion 24a for contacting with the cam hole 22c of the door 22, and a second contacting portion 24b positioned on the opposite side of the first contacting portion 24a with respect to the center of pivotal motion of the relaying member 24 for contacting with the leader pin holder 20. The second contacting portion 24b extends toward the leader pin holder 20 in a neighboring relationship with the upper side plate of the case 12 so as to allow the magnetic tape to run therebelow. An end portion of the second contacting portion 24b is formed as a spring stronger than the spring 20h which biases the leader pin holder 20.

Figure 17:
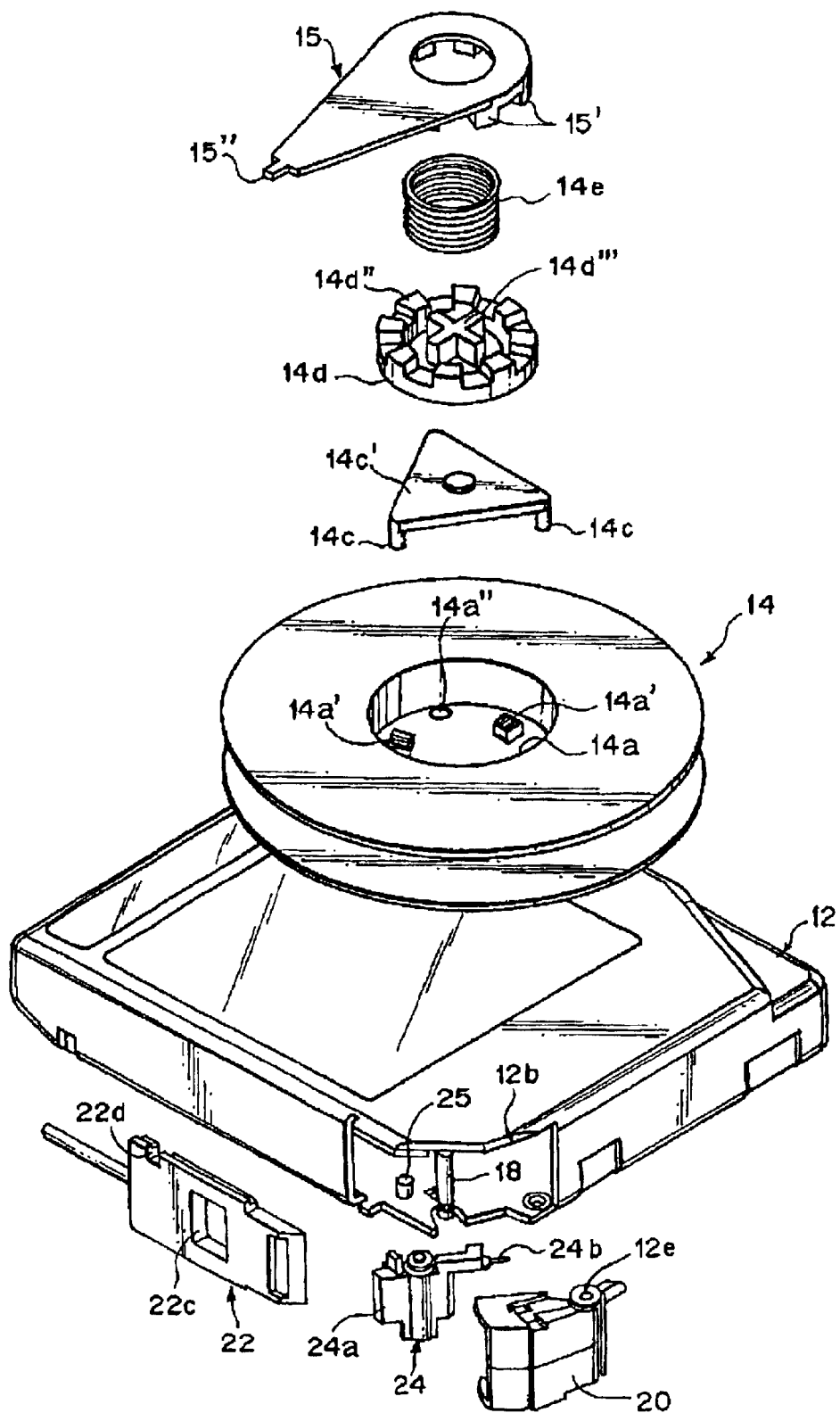
FIG. 17 is an exploded perspective view of the tape cartridge of FIG. 16.
Figure 20:
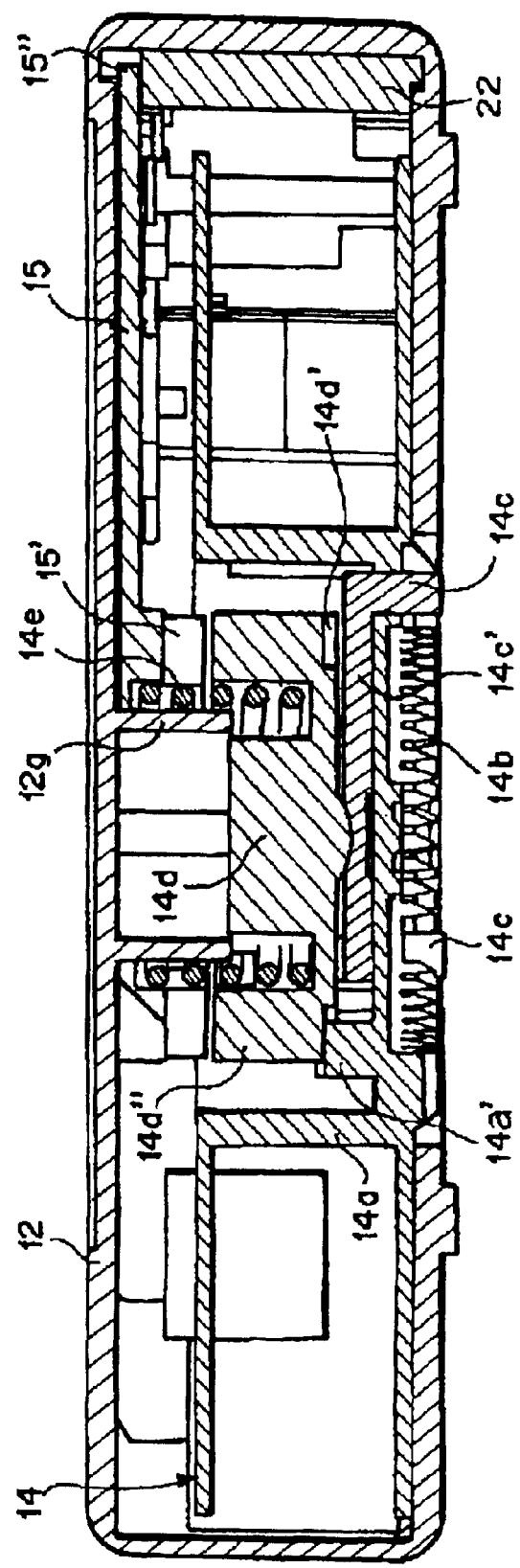
FIG. 20 is a sectional view of the tape cartridge of FIG. 16.

In the present embodiment, the reel locking mechanism includes an unlocking control mechanism. Referring to FIGS. 17 and 20, a first pivotal position adjusting engaging portion 14d" having a concave and convex pattern in a circumferential direction around a vertical axis is formed at an upper portion of the reel locking member 14d. Meanwhile, a lever member 15 is disposed above the reel locking member 14d such that it cooperates with the reel locking member 14d to perform unlocking control. A second pivotal position adjusting engaging portion 15' is formed at a lower portion of the lever member 15 and has a concave and convex pattern in a circumferential direction in a corresponding relationship to the pivotal position adjusting engaging portion 14d" of the reel locking member 14d. The lever member 15 is fitted for rotation around a vertical axis on an outer face of the guide 12g formed to project downwardly on the lower side of a central portion of the upper plate portion (upper side plate) of the cartridge case 12, and an upper end of the coil spring 14e abuts with the lower face of the lever member 15.

Figure 18:
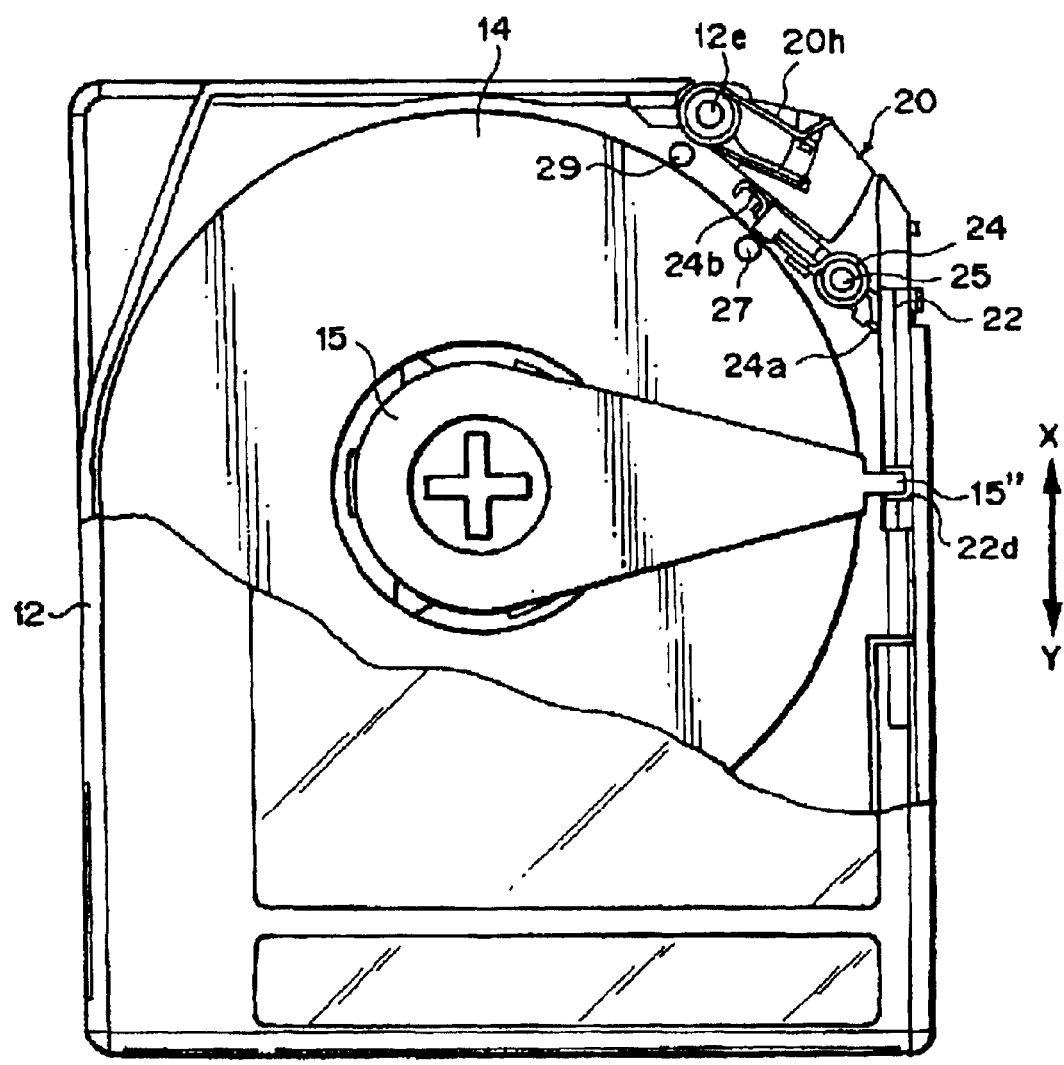
FIG. 18 is a top plan view partly broken of the tape cartridge of FIG. 16.

As shown in FIG. 18 and so forth, a projection 15" formed at an outer end of the lever member 15 engages with a slot 22d formed on an upper edge of the door 22. Accordingly, when the door 22 is opened or closed, the lever member 15 is pivoted around the guide 12g of the case 12 by the door 22.

Figure 19:
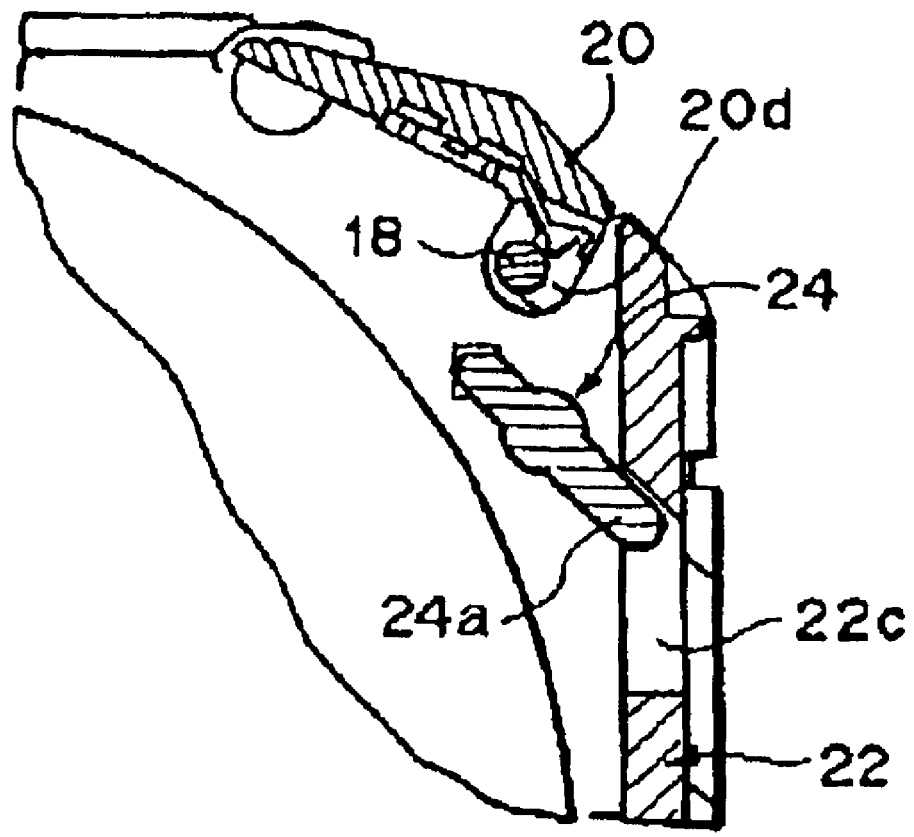
FIG. 19 is a partial sectional view partly broken of the tape cartridge of FIG. 16.
Figure 21:
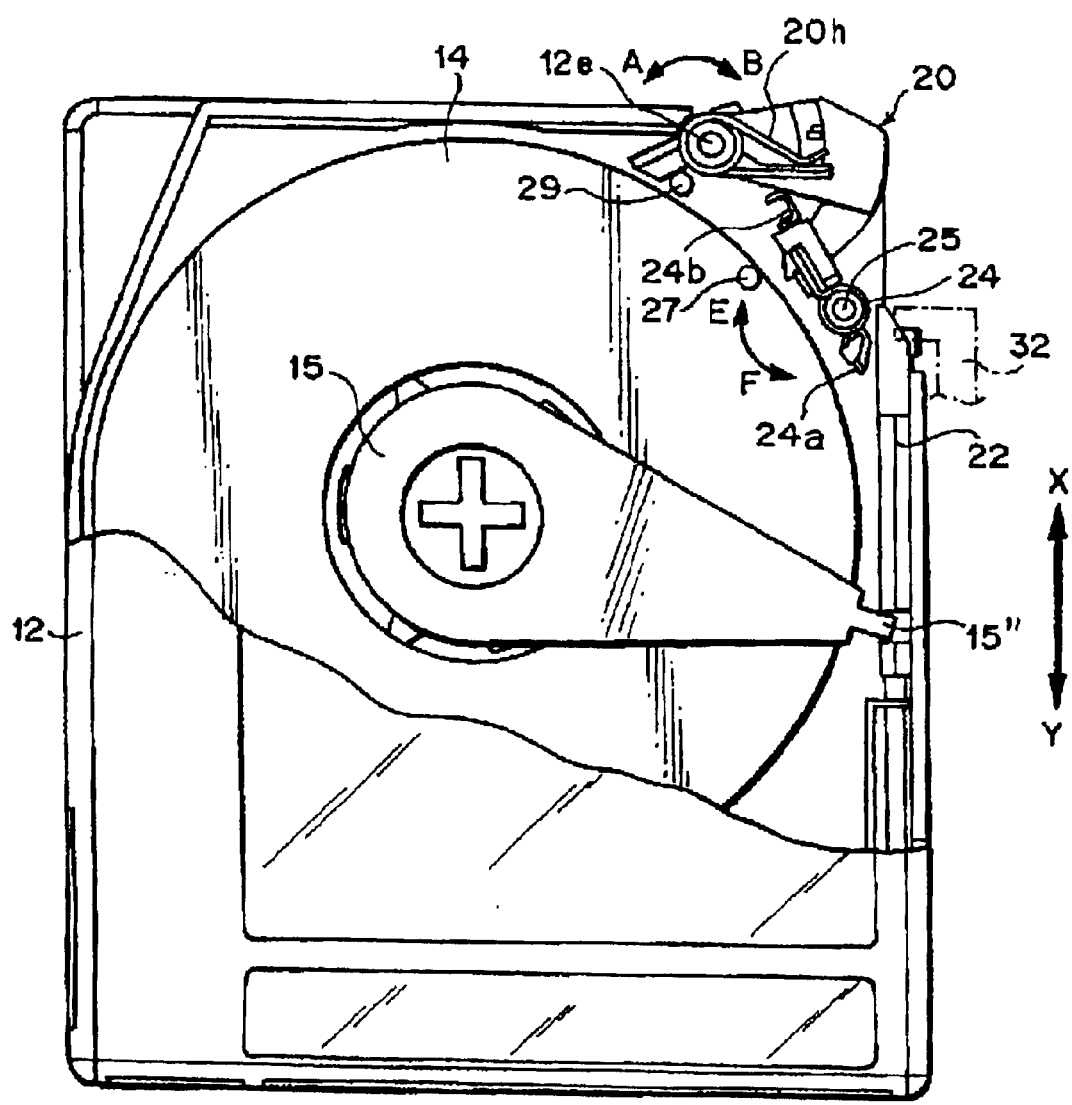
FIG. 21 is a top plan view partly broken showing the tape cartridge of FIG. 16 after loading into a cartridge tray of a magnetic tape drive apparatus is completed.
Figure 24:
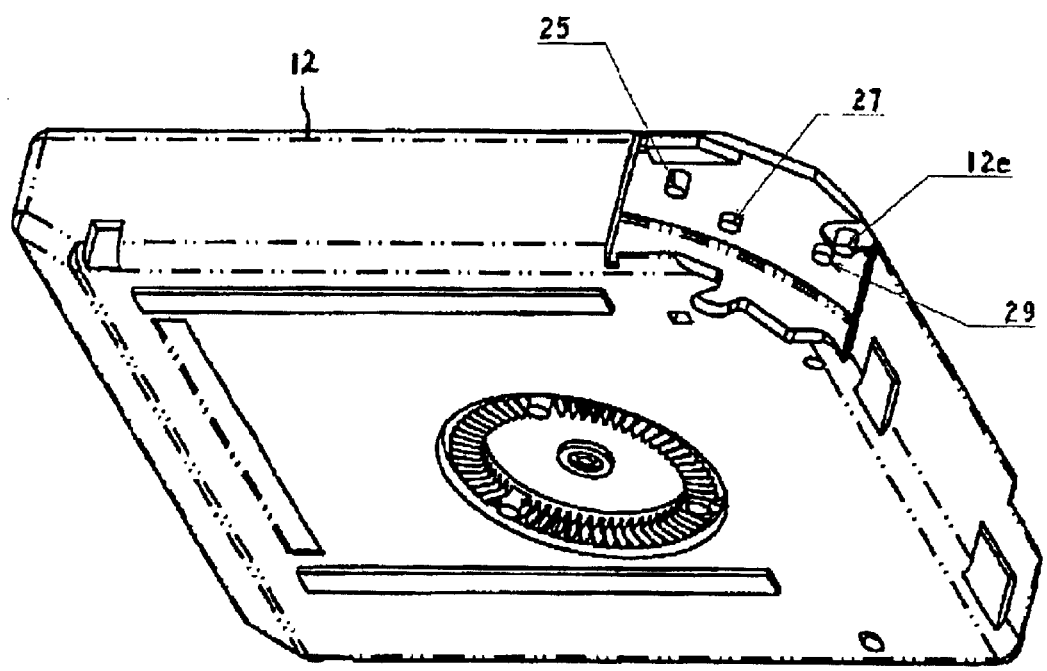

Subsequently, operation of the tape cartridge is described. FIG. 21 is shows the cartridge in a state wherein loading of the cartridge into the cartridge tray of the magnetic tape drive apparatus is completed and the cartridge is stopped at a predetermined position with respect to the tray. It is to be noted that FIGS. 18 and 19 show a state wherein loading of the cartridge into the magnetic drive is not completed, and the first contacting portion 24a of the relaying member 24 is fitted in the cam hole 22c of the door 22 as particularly seen in FIG. 19. The second contacting portion 24b is positioned intermediately between a position at which it contacts with the leader pin holder 20 which is in the closed position and another position at which the relaying member 24 contacts with a pin 27. The pin 27 is provided in a projecting manner on the lower face of the upper side plate of the cartridge case 12 as shown in FIG. 24 and prevents excessive pivotal motion of the relaying member 24 in an F direction in FIG. 21.

Upon transition from the state of FIGS. 18 and 19 to the state of FIG. 21, the engaging projection 32 secured to the cartridge tray is brought into contact with an end of the door 22 to move the door 22 in the Y direction. Thereupon, the first contacting portion 24a of the relaying member 24 which can pivot in the E-F directions around the pin 25 is disengaged from the cam hole 22c of the door 22 and moves to the inner face of the door 22. Consequently, the relaying member 24 is pivoted in the E direction around the pin 25 in FIG. 21, and as a result, the second contacting portion 24b of the relaying member 24 pivots the leader pin holder 20 in the A direction against the biasing force of the spring 20h. The pivotal motion of the leader pin holder 20 is stopped as the leader pin holder 20 contacts with a pin 29. The pin 29 is provided in a projecting manner on the lower face of the upper side plate of the cartridge case 12 as shown in FIG. 24 to stop excessive rotation of the leader pinholder 20 in the A direction in FIG. 21. Consequently, a state wherein the aperture is open is established by positioning the leader pin holder 20 at the open position and positioning the door 22 at the open position. In this state, the leader pin 18 remains held in the slot 20d and is at an advanced position which was outside the cartridge case 12 in the state of FIGS. 18 and 19. Consequently, the leader pin 18 is positioned at a position equivalent to a position at which the leader pin 18 is disposed in the case of a cartridge on which the chamfered portion 12a is not formed similarly as in the tape cartridge of FIGS. 1 to 15.

Further, upon such transition from the state of FIGS. 18 and 19 to the state of FIG. 21 as described above, the lever member 15 which forms the unlocking control mechanism of the reel lock mechanism is pivoted to establish an unlocking allowing state. In particular, in the state of FIGS. 18 and 19, the concave and convex pattern of the pivotal position adjusting engaging portion 15' of the lever member 15 and the concave and convex pattern of the pivotal position adjusting engaging portion 14d" of the reel locking member 14d have such a positional relationship in a circumferential direction that the convex portions thereof contact with each other. In contrast, in the state of FIG. 21, the concave and convex pattern of the pivotal position adjusting engaging portion 15' of the lever member 15 and the concave and convex pattern of the pivotal position adjusting engaging portion 14d" of the reel locking member 14d have such another positional relationship in a circumferential direction that the convex portions of each of them fit with the concave portions of the other of them.

In particular, in the unlocking control mechanism in the present embodiment, the lever member 15 is mounted for pivotal motion between a first pivotal position (the state of FIGS. 18 and 19) and a second pivotal position (the state of FIG. 21) with respect to the cartridge case 12. When the lever member 15 is at the first pivotal position, the reel locking member 14d is held so as to prevent a retreating movement (upward movement through small holes 14a") of the locking pads 14c, but when the lever member 15 is at the second pivotal position, the reel locking member 14d is held so as to permit a retreating movement of the locking pads 14c. The lever member 15 is positioned at the first pivotal position when the door 22 is at the closing position, but when the door 22 is at the open position, the lever member is positioned at the second pivotal position.

Figure 22A:
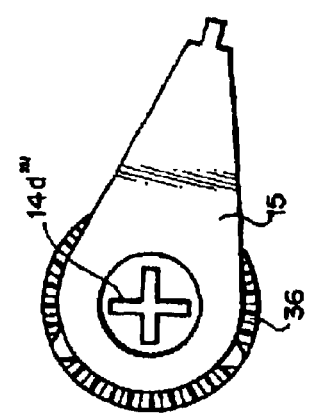
FIGS. 22(a) to 22(c) plan views and side elevational views illustrating operation of an unlocking control mechanism of the tape cartridge of FIG. 16.
Figure 22A:
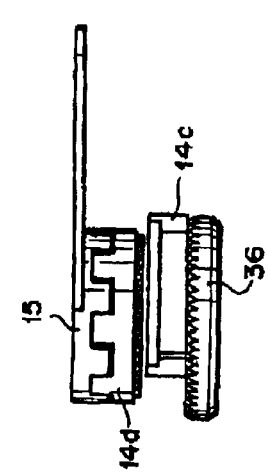
Figure 22B:
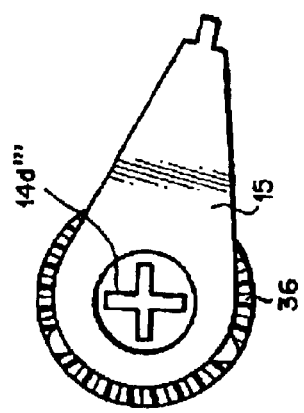
Figure 22B:
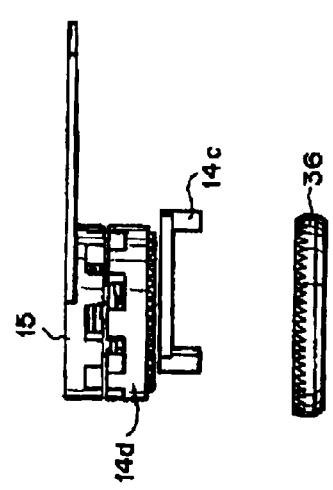
Figure 22C:
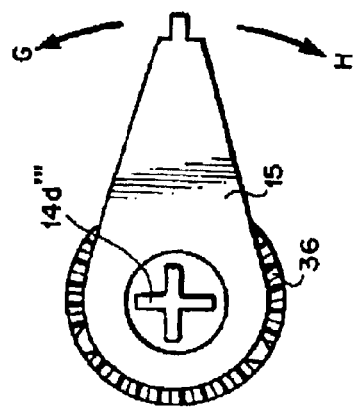
Figure 22C:
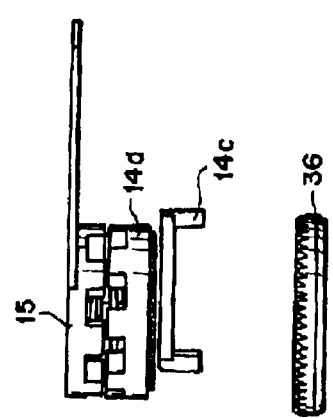

FIGS. 22(a) of 22(c) illustrate operation of the unlocking control mechanism described above and show the drive face gear 36 of the drive apparatus. Particularly, FIG. 22(a) shows the unlocking control mechanism in the state of FIGS. 18 and 19. In this state, the locking member 14d cannot move upwardly and the locking pads 14c and the reel 14 cannot rotate. FIG. 22(b) shows the unlocking control mechanism in the state of FIG. 21. In this state, the locking member 14d can move upwardly, but the locking pads 14c are not pushed up by the drive face gear 36 because the cartridge tray does not yet reach a position at which threading is possible, and therefore, the locking pads 14c and the reel 14 cannot rotate. FIG. 22(c) shows the unlocking control mechanism in a state wherein, while the state of FIG. 21 is maintained, the cartridge tray reaches the position at which threading is possible and the locking pads 14c are pushed up by the drive face gear 36, and locking of the locking pads 14c and the reel 14 is canceled to allow rotation of them.

As described above, in the present embodiment, locking of the reel cannot be canceled until after the state wherein loading of the cartridge into the cartridge tray is completed and the aperture is open is reached. Therefore, the reel can be locked with a higher degree of reliability.

It is to be noted that, upon cancellation of locking of the reel 14, a guide 14d''' of a cross-shaped cross section formed at a central portion of an upper portion of the reel locking member 14d is fitted with and guided by the guide 12g which is formed in an upwardly projecting mater at a central portion of the upper plate portion of the case 12. This similarly also to the tape cartridge of FIGS. 1 to 15.

As described above, also with the tape cartridge of the present invention, threading similar to that in the case of a conventional cartridge having a rectangular outer shape can be performed similarly as in the tape cartridge of the first embodiment of FIGS. 1 to 15. Thus, there is an advantage that a drive apparatus having the same threading mechanism can be used commonly.

In the tape cartridges of the embodiments described above, the cartridge case 12 is shaped so as to have a chamfered portion 12a, and an aperture 12b is formed in the chamfered portion. However, according to the present invention, the shape of the cartridge case is not limited to the specific shape. For example, the cartridge case may be configured such that a lead pin holder and a door similar to those in the embodiments described above are disposed at a corner portion of a rectangular cartridge without forming the chamfered portion 12a such that the leader pin is moved to the outside of the case when the aperture is open. In such an instance, operation of the leader block of the threading mechanism of the drive apparatus should be performed in response to the position of the leader pin when the aperture is open. Also in such an instance, an effect that the leader pin can be taken out without making the leader block for engagement with the leader pin approach the case of the cartridge loaded at a predetermined position of the drive apparatus very much can be achieved.

Where the door is opened or closed upon pivotal motion of the leader pin holder, the required aperture can be opened without making the angle of pivotal motion or the distance of movement upon such opening or closing movement very great. However, it is otherwise possible to open or close the aperture only using the leader pin holder without providing the door.

Further, while the tape cartridges of the embodiments described above relate a tape in the form of a magnetic tape, the tape of the cartridge of the present invention may be, for example, an optical information recording medium tape or any other information recording medium tape, and similar effects are exhibited also where the tape of the cartridge of the present invention is a tape which is taken out for repetitive use other than information recording medium tapes.

While preferred embodiments of the present invention have been described using specific terms, such description is for illustrative purposes only, and it is to be understood that changes and variations may be made without departing from the spirit or scope of the following claims.

What is claimed is:

1. A tape cartridge, comprising:
  a cartridge case;
  a cartridge reel disposed for rotation in said cartridge case;
  a tape wound on said cartridge reel;
  a leader pin attached to an end of said tape;
  a leader pin holder for holding said leader pin;
  said cartridge case having an aperture for permitting passage of said tape therethrough;
  said leader pin holder being movable between a closing position at which said leader pin holder closes at least part of said aperture of said cartridge case and an open position at which said leader pin holder opens at least part of said aperture; and
  means for exerting biasing force to act upon said leader pin holder toward the closing position;
  said leader pin holder being pivoted toward the open position against the biasing force to open at least part of said aperture through engagement thereof with a tape drive apparatus when said tape cartridge is loaded into said tape drive apparatus.

2. A tape cartridge as claimed in claim 1, further comprising:
  a door mounted on said cartridge case for back and forth movement between a closing position at which said door closes part of said aperture and an open position at which said door opens part of said aperture; and
  door biasing means for exerting biasing force to act upon said door toward the closing position;
  said door being moved toward the open position against the biasing force to open part of said aperture through engagement thereof with said tape drive apparatus when said tape cartridge is loaded into said tape drive apparatus.

3. A tape cartridge as claimed in claim 2, further comprising a reel locking mechanism for blocking rotation of said cartridge reel with respect to said cartridge case, said reel locking mechanism including a locking pad disposed in a projecting manner for retreating movement from a reel face gear formed at a portion of said cartridge reel which is exposed from said cartridge case and a locking member disposed under biasing force to project toward said locking pad and blocked from pivotal motion with respect to said cartridge case, said locking member engaging with said cartridge reel to block rotation of said cartridge reel when said locking pad is projected from said reel face gear, said locking member being disengaged from said cartridge reel to permit rotation of said cartridge reel when said locking pad is retracted from said reel face gear, said reel locking mechanism including an unlocking control mechanism which includes a lever member mounted on said cartridge case for pivotal motion between a first pivotal position and a second pivotal position with respect to said cartridge case, said lever member keeping, when said lever member is at the first pivotal position, said locking member so as to block the retreating movement of said locking pad whereas said lever member keeps, when said lever member is at the second pivotal position, said locking member so as to permit the retreating movement of said locking pad, said lever member being engaged at an end thereof with said door such that said lever member is positioned at the first pivotal position when said door is at the closing position but is positioned at the second pivotal position when said door is at the open position.

4. A tape cartridge as claimed in claim 1, further comprising:

a door mounted on said cartridge case for back and forth movement between a closing position at which said door closes part of said aperture and an open position at which said door opens part of said aperture;

door biasing means for exerting biasing force to act upon said door toward the closing position;

said door being moved toward the open position against the biasing force to open part of said aperture through engagement thereof with said tape drive apparatus when said tape cartridge is loaded into said tape drive apparatus; and a relaying member for engaging with said door and said leader pin holder such that, when said door moves from the closing position to the open position, said relaying member moves said leader pin holder toward the open position against the biasing force thereby to open at least part of said aperture.

5. A tape cartridge as claimed in claim 4, wherein said door has a cam at a portion thereof at which said door engages with said relaying member, and said relaying member is mounted for pivotal motion on said cartridge case and has a first contacting portion for contacting with said cam of said door and a second contacting portion for contacting with said leader pin holder such that said second contacting portion is acted upon by pivoting force originating from the biasing force from said leader pin holder, whereupon said first contacting portion is pressed toward said door by the pivoting force.

6. A tape cartridge as claimed in claim 5, wherein said second contacting portion of said relaying member has flexibility.

7. A tape cartridge as claimed in claim 1, wherein said aperture is formed in an end face at a corner portion on the front side of said cartridge case with respect to an insertion direction of said tape cartridge into said tape drive apparatus.

8. A tape cartridge as claimed in claim 7, wherein the corner portion of said cartridge case at which said aperture is formed is formed as a chamfered portion of a cutaway shape, and said leader pin holder is positioned so as to close principally a portion of said aperture corresponding to said chamfered portion.

9. A tape cartridge as claimed in claim 1, wherein said leader pin holder has two slots for accommodating the opposite ends of said leader pin.

10. A tape cartridge as claimed in claim 1, further comprising a reel locking mechanism for blocking rotation of said cartridge reel with respect to said cartridge case, said reel locking mechanism including a locking pad disposed in a projecting manner for retreating movement from a reel face gear formed at a portion of said cartridge reel which is exposed from said cartridge case and a locking member disposed under biasing force to project toward said locking pad and blocked from pivotal motion with respect to said cartridge case, said locking member engaging with said cartridge reel to block rotation of said cartridge reel when said locking pad is projected from said reel face gear, said locking member being disengaged from said cartridge reel to permit rotation of said cartridge reel when said locking pad is retracted from said reel face gear.

11. A tape cartridge as claimed in claim 1, wherein said leader pin holder has a lever portion, and said cartridge case has an opening formed therein for allowing said lever portion of said leader pin holder and an engaging projection of said tape drive apparatus to engage with each other thereby to open at least part of said aperture.

* * * * *